United States Patent
Lehre et al.

(10) Patent No.: US 7,714,771 B2
(45) Date of Patent: May 11, 2010

(54) METHOD AND DEVICE FOR MEASURING THE DISTANCE AND RELATIVE SPEED OF MULTIPLE OBJECTS

(75) Inventors: Klaus Lehre, Malsch (DE); Oliver Wackerl, Kirchheim an der Teck (DE); Joerg Hilsebecher, Hildesheim (DE); Joachim Hauk, Renningen-Malmsheim (DE); Martin Reiche, Weil der Stadt (DE); Martin Randler, Immenstaad (DE); Ruediger Jordan, Stuttgart (DE)

(73) Assignee: Robert Bosch GmbH, Stutttgart (DE)

( * ) Notice: Subject to any disclaimer, the term of this patent is extended or adjusted under 35 U.S.C. 154(b) by 0 days.

(21) Appl. No.: 11/886,895

(22) PCT Filed: Mar. 2, 2006

(86) PCT No.: PCT/EP2006/060404

§ 371 (c)(1),
(2), (4) Date: Dec. 17, 2008

(87) PCT Pub. No.: WO2006/100167

PCT Pub. Date: Sep. 28, 2006

(65) Prior Publication Data

US 2009/0219190 A1    Sep. 3, 2009

(30) Foreign Application Priority Data

Mar. 21, 2005   (DE) .................. 10 2005 012 945

(51) Int. Cl.
*G01S 13/32*   (2006.01)
*G01S 13/42*   (2006.01)
*G01S 13/50*   (2006.01)
*G01S 13/00*   (2006.01)
*G01S 13/93*   (2006.01)

(52) U.S. Cl. .............. 342/109; 342/70; 342/104; 342/118; 342/128; 342/129; 342/175; 342/195

(58) Field of Classification Search ............. 342/27, 342/28, 70–72, 104–115, 118, 127–147, 342/159–164, 175, 192–197
See application file for complete search history.

(56) References Cited

U.S. PATENT DOCUMENTS 2,958,862 A * 11/1960 Rey .................... 342/128

(Continued)

FOREIGN PATENT DOCUMENTS

DE    42 42 700   *  6/1994

(Continued)

*Primary Examiner*—Bernarr E Gregory
(74) *Attorney, Agent, or Firm*—Kenyon & Kenyon LLP

(57) ABSTRACT

A method and device are provided for measuring distance and relative speed of a plurality of objects with the aid of an FMCW radar, transmitted signals being reflected by objects, and the reflected signals being received and mixed with the transmitted signals. A combination of distance and relative speed values is assigned to the mixer output frequencies of each frequency ramp for each object, and the distance and relative speed of a possible object are determined from points of intersection of a plurality of distance and relative speed combinations. The apparent (unreal) objects are eliminated by modifying the frequency slope of at least one frequency ramp according to the random principle in a subsequent measurement cycle.

10 Claims, 3 Drawing Sheets

U.S. PATENT DOCUMENTS

| | | | |
|---|---|---|---|
| 3,179,935 A * | 4/1965 | Blass | 342/131 |
| 3,373,426 A * | 3/1968 | Miller, Jr. | 342/109 |
| 3,710,387 A * | 1/1973 | Hinchman et al. | 342/145 |
| 3,735,402 A * | 5/1973 | Mosher | 342/109 |
| 3,878,525 A * | 4/1975 | Alpers | 342/109 |
| 3,893,114 A * | 7/1975 | Yamanaka et al. | 342/72 |
| 4,079,377 A * | 3/1978 | zur Heiden et al. | 342/109 |
| 4,611,211 A * | 9/1986 | Leitl et al. | 342/107 |
| 5,181,037 A * | 1/1993 | Komatsu | 342/70 |
| 5,229,774 A * | 7/1993 | Komatsu | 342/70 |
| 5,751,240 A * | 5/1998 | Fujita et al. | 342/70 |
| 5,805,104 A * | 9/1998 | Kunert | 342/109 |
| 5,920,280 A * | 7/1999 | Okada et al. | 342/109 |
| 6,097,331 A * | 8/2000 | Matsugatani et al. | 342/70 |
| 6,140,954 A * | 10/2000 | Sugawara et al. | 342/70 |
| 6,317,073 B1 * | 11/2001 | Tamatsu et al. | 342/70 |
| 6,320,531 B1 * | 11/2001 | Tamatsu | 342/109 |
| 6,396,436 B1 * | 5/2002 | Lissel et al. | 342/70 |
| 6,888,494 B2 * | 5/2005 | Tamatsu et al. | 342/128 |
| 2004/0257266 A1 * | 12/2004 | Pleva et al. | |

FOREIGN PATENT DOCUMENTS

| | | | |
|---|---|---|---|
| DE | 199 22 411 | * | 10/2000 |
| DE | 100 12 113 | * | 10/2001 |
| DE | 100 26 032 | * | 11/2001 |

* cited by examiner

METHOD AND DEVICE FOR MEASURING THE DISTANCE AND RELATIVE SPEED OF MULTIPLE OBJECTS

BACKGROUND OF THE INVENTION

1. Field of the Invention

The present invention relates to a method and a device for measuring the distance and relative speed of multiple objects using an FMCW (frequency modulated continuous wave) radar, in which transmitted signals having linear time-frequency ramps are emitted and the signals reflected on the objects are received and mixed with the transmitted signals.

2. Description of Related Art

Published German patent document DE 42 42 700 describes a method for measuring the distance and speed of objects with the aid of electromagnetic waves, in which the frequency of a transmitted signal is modulated. The signals received during a rise and a fall of the frequency of the transmitted signal are mixed with the transmitted signal and the intermediate frequency signals resulting from the mixing are spectrally analyzed. The distance and speed of at least one object is computed from the frequency of spectral lines of the intermediate frequency signals during at least one rise and at least one fall of the frequency of the transmitted signal.

In this procedure, an intermediate frequency is obtained for each frequency ramp and each detected object; the frequency position of this intermediate frequency may be assigned to a combination of distance and relative speed values. The combination of these intermediate frequency signals and associated distance and relative speed values yields common points of intersection, which may be represented in a distance-relative speed diagram for example. These points of intersection represent the measured distances and relative speeds of the objects. When a plurality of objects is detected, for example two objects, a total of four points of intersection are obtained, two of these points of intersection representing real objects and two further points of intersection being apparent objects obtained as a result of ambiguities.

To be able to rule out such ambiguities, the FMCW radar method has been refined in such a way that a plurality of consecutive frequency rises and falls are strung next to one another, the frequency ramps having different slopes. However, even with this refined method, situations may actually arise in which such apparent objects are detected over a number of measurement cycles as a result of multiple detected objects and are processed as real objects, since these apparent reflections continue to be received over a long period of time. In particular, in traffic situations where a plurality of detected objects moves with the same dynamics, i.e., when the distances and relative speeds of the plurality of objects change only very slowly over time, apparent objects remaining unchanged may continue to be received over a number of measurement cycles, because these objects are recognized by tracking methods and processed as real objects, although they are apparent objects.

A BRIEF SUMMARY OF THE INVENTION

An object of the present invention is to provide a method and a device for distance and relative speed measurement of a plurality of objects with the aid of an FMCW radar, objects being detected within a short period of time as real objects or apparent objects, and this detection taking place with a very high degree of reliability.

The frequency slope of the at least one frequency ramp is modified in such a way that one frequency slope is randomly selected from a plurality of predefined frequency slopes. It is furthermore advantageous that the frequency slopes of all frequency ramps of the transmitted signal are selected by the random principle.

A plurality of frequency slope patterns is advantageously stored for measurement cycles, from which one of the frequency slope patterns is selected by the random principle.

The method is advantageously used in a motor vehicle for adaptive cruise control and/or for triggering automatic emergency braking.

It is furthermore advantageous that the frequency slope of the at least one frequency ramp is modified in such a way that a frequency slope is selected with the aid of the random generator from a plurality of frequency slopes stored in a memory.

The frequency slopes of all frequency ramps of the transmitted signal are advantageously selected with the aid of the random generator.

A plurality of frequency slope patterns for measurement cycles is advantageously stored in a memory; one of the frequency slope patterns is selected therefrom with the aid of the random generator.

The device is particularly advantageously used in a motor vehicle for adaptive cruise control and/or for triggering automatic emergency braking.

Of particular importance is the implementation of the method according to the present invention in the form of a control element which is provided for a control unit of an adaptive distance or cruise control system of a motor vehicle. In this connection, a program is stored on the control element, the program being executable on a computer, in particular on a microprocessor or signal processor, and being suitable for performing the method according to the present invention. An electric memory medium such as a read-only memory may be used in particular as the control element.

DETAILED DESCRIPTION OF THE INVENTION

Figure 1A:
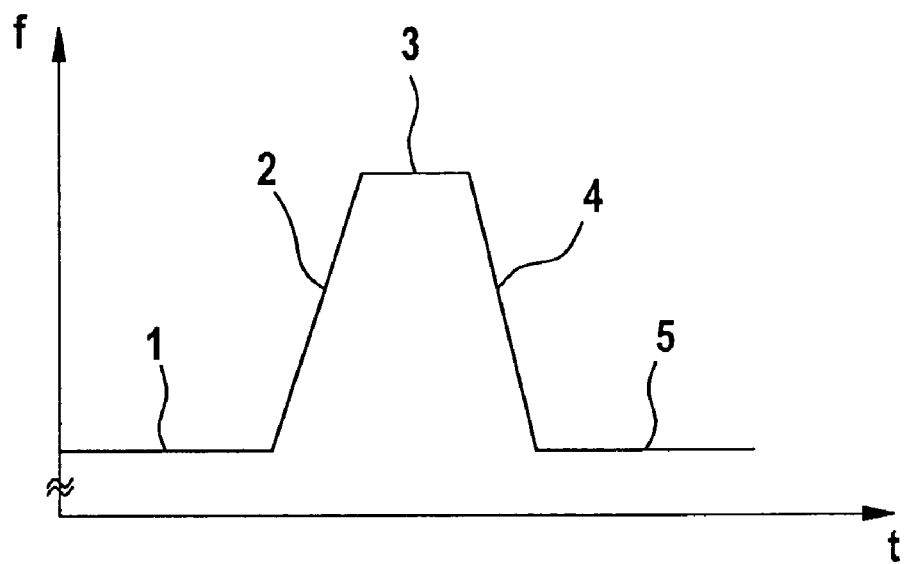
FIG. 1a shows a frequency-time diagram of an FMCW transmitted signal having two frequency ramps.

FIG. 1a shows the frequency-time diagram of an FMCW transmitted signal as described in the related art. For this purpose, the transmitted signal has a first time segment 1, during which the transmitted frequency of the radar signal remains constant. During a second time segment 2 the transmitted frequency of the radar signal increases to a higher frequency, remains in the increased frequency area during a third time segment 3 and in a fourth time segment 4 it drops again to the original transmitted frequency of the radar signal, whereupon the transmitted frequency remains constant again. This results in a frequency profile over time which has a trapezoidal shape and has both rising and falling frequency ramps 2, 4 in addition to time segments of constant transmitted frequency 1, 3, 5. The transmitted radar signal is reflected by objects within the object detection range and is received again. The transmitted frequency undergoes a Doppler shift due to the reflection of the transmitted signals on moving objects, so that the frequency of the received signal is Doppler shifted with respect to the transmitted signal. In time ranges where the transmitted frequency increases linearly over time, i.e., in time segment 2, the frequency of the transmitted signal continues to rise, so that as a result of the shift in the transit time of the received signal with respect to the transmitted signal, an additional frequency shift occurs as a result of the ramp-shaped frequency rise. This frequency shift of the received signal with respect to the transmitted signal as a result of the signal transit time, as well as the frequency shift as a result of the Doppler effect, overlap and are not separable in the received signal.

The received signal is mixed with the transmitted signal in the receiver, whereupon intermediate frequencies having frequency shifts $f_n$ are obtained. A combination of distance values and relative speed values may be assigned to this frequency shift $f_n$ and, if all possible distance and relative speed combinations are plotted in a relative speed-distance diagram, it yields in a falling straight line 6 for rising frequency ramp 2. If the same object is detected at falling frequency ramp 4, a different frequency shift $f_n$ is obtained, to which combinations of distance values and relative speed values may also be assigned.

Figure 1B:
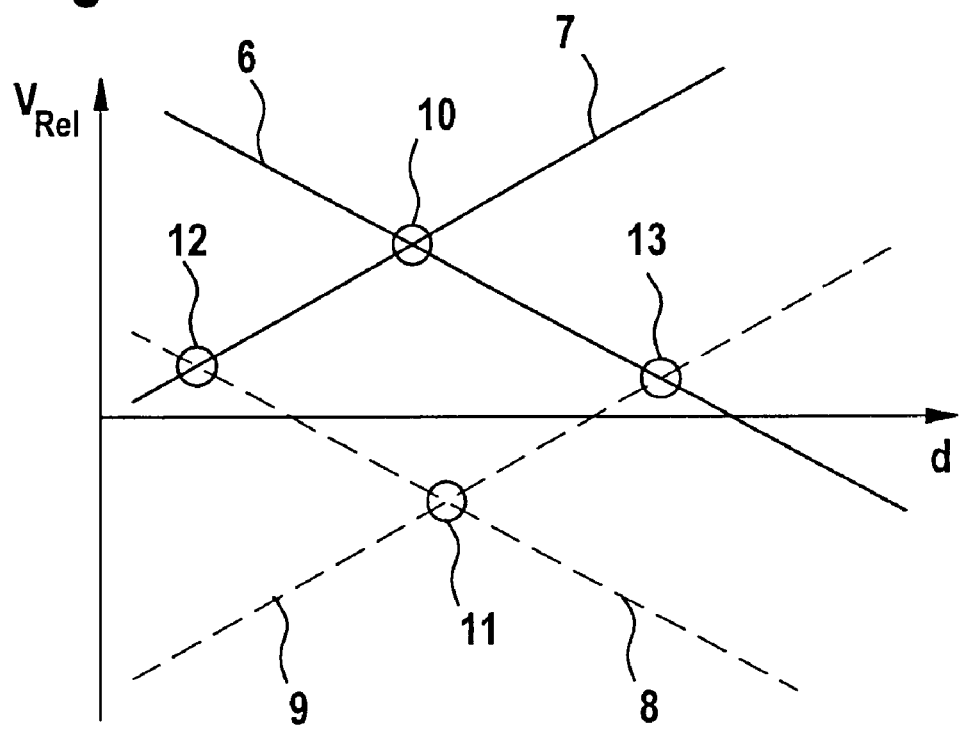
FIG. 1b shows a corresponding relative speed-distance diagram of an FMCW radar having two frequency ramps with the aid of which two objects have been detected.

These combinations for falling frequency ramp 4 result in a rising straight line 7 in the relative speed-distance diagram of FIG. 1b. Point of intersection 10 of falling straight lines 6 and rising straight lines 7 yields distance d and relative speed vrel of the detected object. In the case where two objects are detected simultaneously, intermediate frequencies of different frequency shifts are obtained each time for rising frequency ramp 2, which are represented in the relative speed-distance diagram of FIG. 1b as straight line 6 for the first object and as dashed straight line 8 for the second object. For falling frequency ramps 4, rising straight lines 7 for the first object and dashed straight line 9 for the second object are obtained. These four straight lines 6, 7, 8, 9 have, however, a total of four points of intersection 10, 11, 12, 13 in the relative speed-distance diagram of FIG. 1b, two points of intersection 10 and 11 representing real objects and the two other points of intersection 12 and 13 representing apparent objects.

The decision as to which of the points of intersection are real objects and which are apparent objects must be made in the subsequent analysis of the objects, since it is impossible to make such a decision on the basis of the mere points of intersection. For this purpose, it is known, for example, that object tracking may be performed, in which such objects are detected and stored over a longer time period and, on the basis of their movement, may be recognized as real objects or, on the basis of jumps of the calculated relative speed or of the distance may be classified as apparent objects. One problem of this method, however, is that in the event of nose-to-tail driving using a radar system of this type, in which the preceding detected objects have approximately the same distance and approximately the same relative speed over a longer time period, i.e., in driving situations in which the determined quantities vrel and d change only very slowly and therefore also apparent objects of points of intersection 12 and 13 are preserved over a long time period and cannot be identified as apparent objects using a tracking method.

Figure 2:
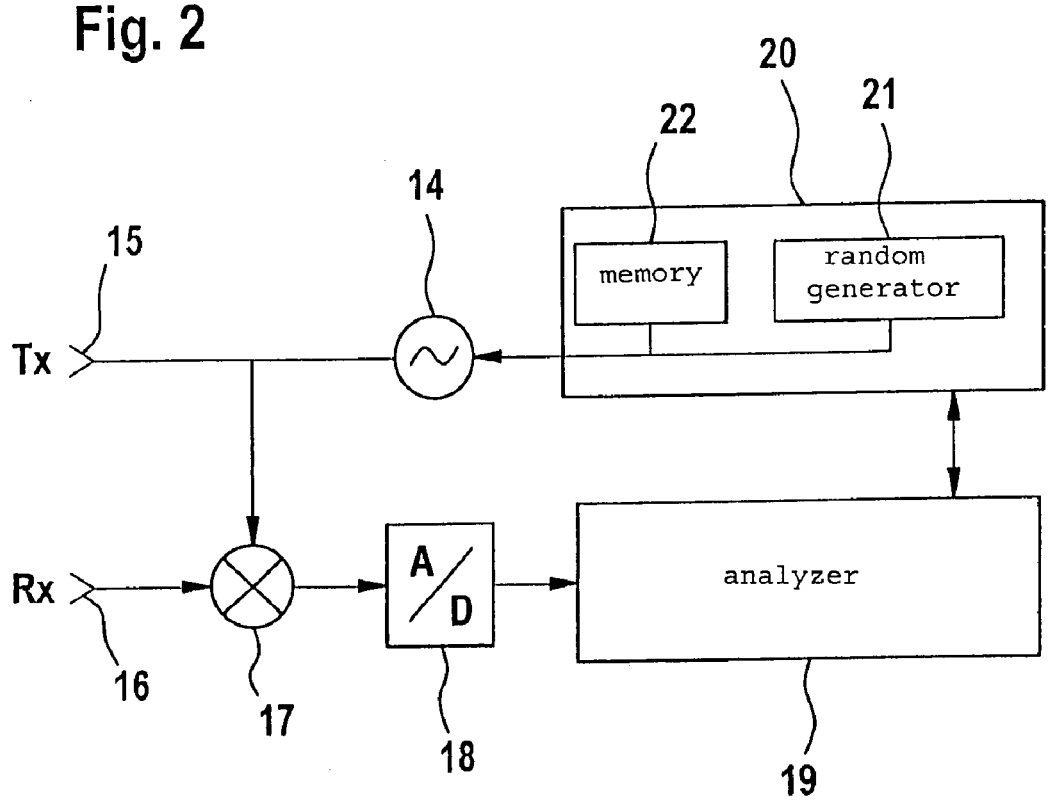
FIG. 2 shows a schematic block diagram of an example embodiment of the device according to the present invention.

An example embodiment of the device according to the present invention is illustrated in FIG. 2. It shows a transmitting oscillator 14, which receives control signals of a control device 20 and generates a transmitted signal on the basis of the control signals supplied to it. This transmitted signal is supplied to a transmitting antenna 15 (Tx), which emits the transmitted signal. The transmitted signals emitted with the aid of transmitting antenna 15 are reflected on objects within the object detection range, and the reflected signals are received with the aid of receiving antenna 16 (Rx). Of course, this device may also be designed as a monostatic radar sensor, in which a single antenna is used for transmitting and receiving, in which case a duplexer is needed, which separates the transmitted signals from the received signals. This monostatic design of the radar sensor may be implemented, for example, with the aid of an additional ring mixer.

The transmitted signal of transmitting oscillator 14 and the received signal of receiving antenna 16 are supplied to a mixer 17, which mixes the two input signals to form an intermediate frequency signal, which has frequency shifts $f_n$ as a function of distance d and relative speed vrel of the detected objects and as a function of the number of detected objects. These intermediate frequency signals are supplied to an analog-digital converter 18, which supplies digitized intermediate frequency signals $f_n$ to an analyzer 19. A Fourier transform may be performed in analyzer 19, for example, which outputs a spectrum from which the intermediate frequency signals may be obtained and further processed for ascertaining relative speeds $vrel_n$ and distances $d_n$ of the n detected objects. Knowing the slopes of rising frequency ramps 2 and falling frequency ramps 4, straight lines 6 through 9 of the relative speed-distance diagram may be calculated, from which the points of intersection and actual distances $d_n$ and relative speeds $vrel_n$ of the objects may also be derived.

Figure 3A:
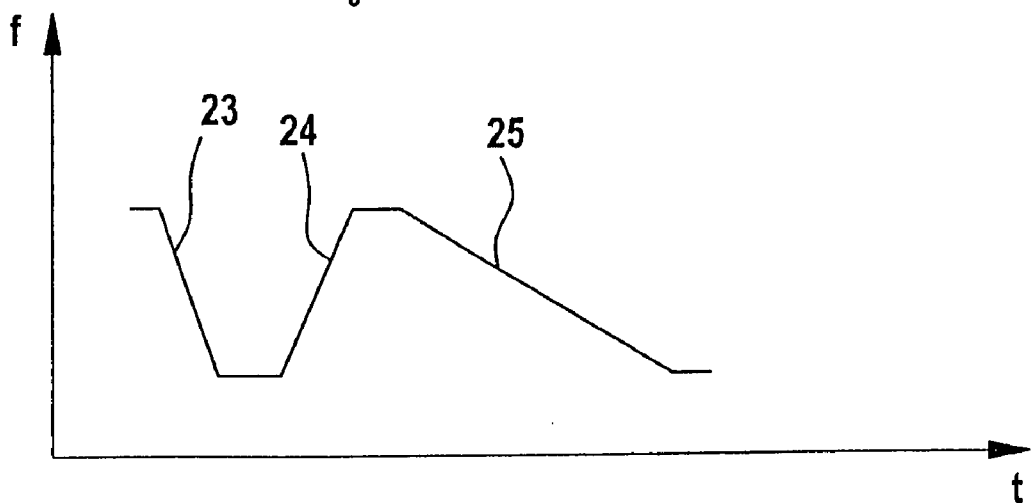
FIG. 3a shows a frequency-time diagram of one example embodiment of the method according to the present invention at a first point in time $t=t_0$.
Figure 3B:
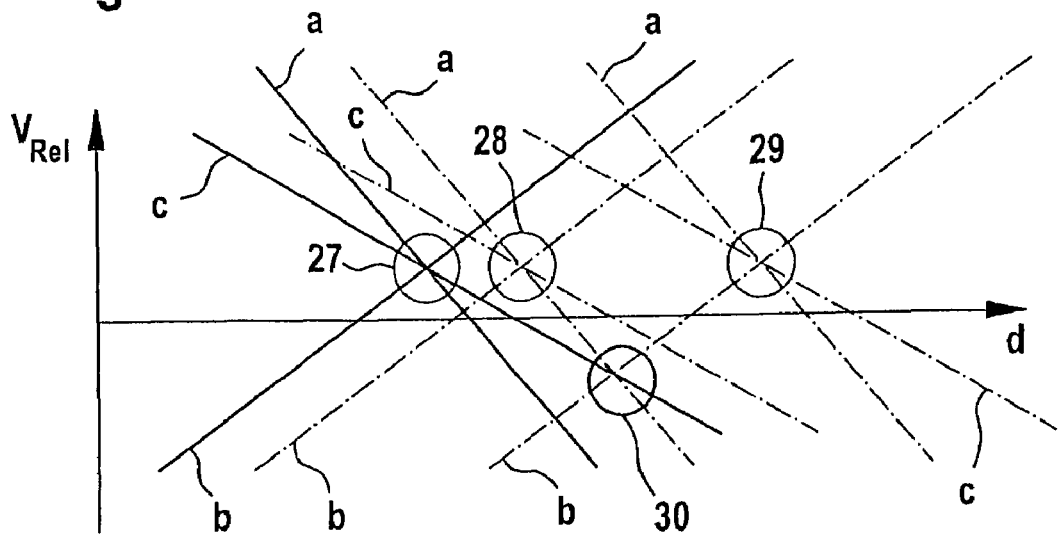
FIG. 3b shows a relative speed-distance diagram at the measuring point in time $t=t_0$.

For reliably differentiating the points of intersection of real objects 10, 11 and the points of intersection of apparent objects 12, 13, the frequency slope of at least one frequency ramp is randomly modified according to the present invention. For this purpose, FIG. 3a shows a transmitted signal of a first measurement cycle at point in time $t=t_0$, which has three individual frequency ramps 23, 24, 25. FIG. 3b shows the corresponding relative speed-distance diagram, which has been obtained from the intermediate frequency signals of a total of three detected objects. On the basis of the three frequency ramps 23, 24, and 25, a point of intersection of three straight lines a, b, and c is obtained for each object 27, 28, 29.

A total of three intermediate frequencies $f_n$ which are shown in the diagram of FIG. 3b as straight lines a are thus generated for first frequency ramp 23, which is reflected on each of the objects. In order to be able to differentiate the straight lines of the individual objects, these straight lines are depicted as solid, dotted and double-dotted lines. Second frequency ramp 24 also generates a total of three straight lines, shown in FIG. 3b as straight lines b, via reflection on three objects. Third frequency ramp 25 also generates three straight lines in the diagram of FIG. 3b, which are shown as straight lines c. The points of intersection of three straight lines a, b, and c thus define the distance and relative speed values of the three detected objects 27, 28, and 29. This configuration of objects results in an additional point of intersection 30 of straight lines, at which also three straight lines intersect and which represents an apparent object.

Figure 4A:
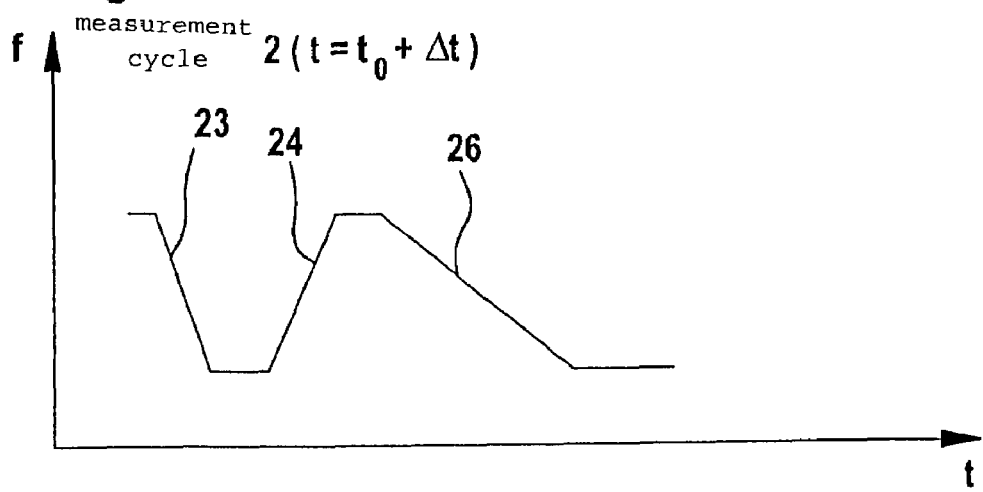
FIG. 4a shows a frequency-time diagram of the example embodiment of the method according to the present invention at a later point in time $t=t_0+\Delta t$.
Figure 4B:
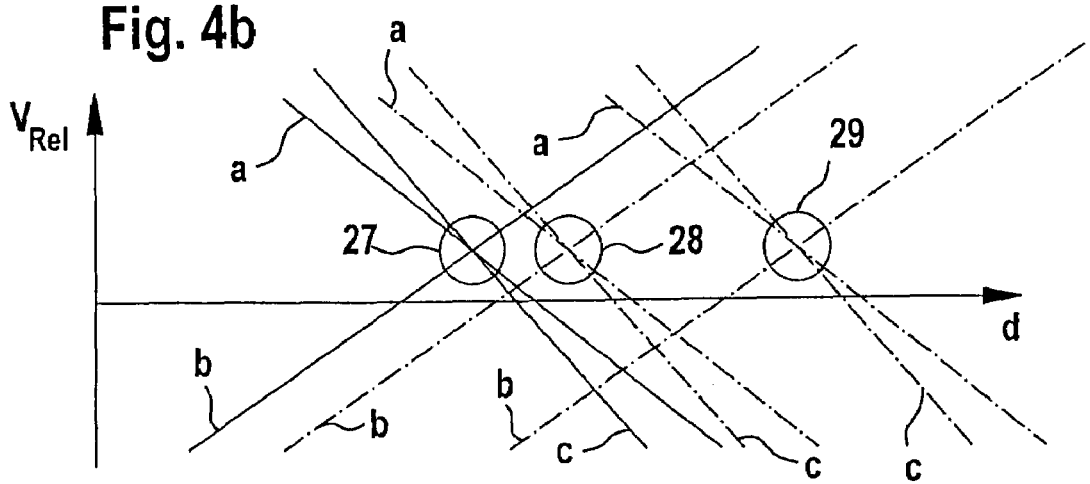
FIG. 4b shows a relative speed-distance diagram at the later point in time $t=t_0+\Delta t$.

According to the present invention, in the following measurement cycle 2, which is performed at a point in time $t=t_0+\Delta t$, the frequency slope of at least one of the frequency ramps is modified. In the present case, frequency ramps 23 and 24, as shown in FIG. 4a, were left unmodified with respect to previous measurement cycle 1; however, the slope of third frequency ramp 25 of FIG. 3a has been modified, so that a new, third frequency ramp 26 has been obtained. These three frequency ramps are emitted again and reflected on objects 27, 28, and 29. In the relative speed diagram of FIG. 4b points of intersection of three straight lines a, b, c, are also obtained again, which represent the distance values and relative speed values of real objects 27, 28, and 29. As a result of the random modification of the frequency slope of frequency ramp 26, however, straight lines c in FIG. 4b have different slopes in comparison with straight lines c of FIG. 3b, so that randomly obtained apparent object 30 in FIG. 4b is no longer present.

The points of intersection of real objects 27, 28, and 29 are thus preserved over a plurality of measurement cycles due to the random modification of the frequency slope of at least one frequency ramp; however, the points of intersection of the apparent objects in the relative speed-distance diagram suddenly disappear or suddenly new ones appear, which, however, are detectable only for a single measurement cycle until at least one frequency ramp is modified again. By comparing the points of intersection of two consecutive measurement cycles in diagrams 3b and 4b, it is therefore possible to differentiate between real objects and apparent objects on the basis of whether the points of intersection of the straight lines are detectable over a plurality of measurement cycles or are measurable for only one single measurement cycle after which they disappear.

The frequency slope of at least one frequency ramp may be modified with the aid of a random generator 21 and optionally a memory 22 as shown in FIG. 2. For example, one of the plurality of frequency slopes stored in a memory 22 is selected by random generator 21, for example, which may be part of control device 20, and the frequency of transmitting oscillator 14 is controlled as a function of this frequency slope. It is conceivable that a plurality of frequency slope profiles is stored in memory 22 of control device 20, each profile including a sequence of a plurality of falling and rising frequency ramps. It is furthermore conceivable that random generator 21 selects any of the frequency slopes and randomly strings them in any order to form a frequency profile of a measurement cycle, so that pseudo-random frequency curves are obtained, making it possible to reliably identify and eliminate apparent objects over at least two measurement cycles.

What is claimed is:

1. A method for measuring distances and relative speeds of a plurality of objects with the aid of an FMCW radar, comprising:
transmitting emitted signals having linear time-frequency ramps, wherein the transmitted emitted signals are reflected by objects;
receiving the reflected signals;
mixing the received reflected signals with the transmitted emitted signals, using a mixer;
assigning a combination of distance and relative speed values to mixer output frequencies of each frequency ramp for each object;
determining the distance and relative speed of each possible object based on points of intersection of a plurality of distance and relative speed combinations, wherein each possible object is one of an apparent object or a real object; and
eliminating each apparent object from further consideration by modifying a frequency slope of at least one frequency ramp randomly in a subsequent measurement cycle.

2. The method as recited in claim 1, wherein, for the modification, the frequency slope of the at least one frequency ramp is randomly selected from a plurality of predefined frequency slopes.

3. The method as recited in claim 2, wherein a plurality of frequency slope patterns is stored for measurement cycles, and wherein one of the plurality of frequency slope patterns is selected randomly.

4. The method as recited in claim 2, wherein the method is used in a motor vehicle for at least one of adaptive cruise control and triggering automatic emergency braking.

5. The method as recited in claim 1, wherein, for the modification, frequency slopes of all frequency ramps of the transmitted emitted signals are selected randomly.

6. A device for measuring distances and relative speeds of a plurality of objects, comprising:
an FMCW radar sensor including:
a transmitting device for transmitting emitted signals having linear time-frequency ramps, wherein the transmitted emitted signals are reflected by objects;
a receiving device for receiving the reflected signals; and
a mixer for mixing the received reflected signals with the transmitted emitted signals; and
an analyzer which receives mixer output signals and assigns a combination of distance and relative speed values to mixer output frequencies of each frequency ramp for each object, and wherein the analyzer determines the distance and relative speed of each possible object based on points of intersection of a plurality of distance and relative speed combinations, wherein each possible object is one of an apparent object or a real object, and wherein the analyzer includes a random generator for modifying a frequency slope of at least one frequency ramp randomly in a subsequent measurement cycle for eliminating each apparent object from further consideration.

7. The device as recited in claim 6, wherein, for the modification, the frequency slope of the at least one frequency ramp is randomly selected with the aid of the random generator from a plurality of predefined frequency slopes stored in a memory.

8. The device as recited in claim 7, wherein a plurality of frequency slope patterns for measurement cycles is stored in a memory, and wherein one of the frequency slope patterns is randomly selected with the aid of the random generator.

9. The device as recited in claim 7, wherein the device is used in a motor vehicle for at least one of adaptive cruise control and triggering automatic emergency braking.

10. The device as recited in claim 6, wherein, for the modification, frequency slopes of all frequency ramps of the transmitted emitted signals are randomly selected with the aid of the random generator.

* * * * *